United States Patent Office 3,606,820
Patented Sept. 21, 1971

3,606,820
SELECTOR VALVE FOR SIMULTANEOUS
OPERATION OF MULTIPLE ACTUATORS
Alfred W. Thomas, Earl Shilton, England, assignor to
Massey-Ferguson Services N.V., Curacao, Netherlands
Antilles
Filed Nov. 10, 1969, Ser. No. 875,004
Claims priority, application Great Britain, Nov. 11, 1968,
53,282/68
Int. Cl. F15b 11/16
U.S. Cl. 91—413                                    6 Claims

ABSTRACT OF THE DISCLOSURE

A hydraulic control system is provided for a motor vehicle having a plurality of hydraulically operated attachments and includes valve means for controlling hydraulic pressure so that a constant hydraulic pressure may be supplied to one of the said attachments while an intermittent hydraulic pressure is supplied, simultaneously, to another attachment.

---

This invention relates to valves, especially but not exclusively for hydraulic control systems for motor vehicles.

In a motor vehicle, such as an agricultural or industrial tractor, having hydraulically operated attachments and a hydraulic control system therefor, it is often necessary to supply a constant hydraulic pressure to one attachment while simultaneously supplying an intermittent hydraulic pressure to another attachment.

Hydraulic control systems are known which have valves which meet this requirement by supplying a constant pressure to the pertinent attachment and thereafter hydraulically locking that pressure in the attachment while intermittent pressure is being applied to the other attachment. However, such known systems have a disadvantage in that leakage may occur in the constant pressure attachment when the latter is locked, thus rendering the pertinent attachment ineffective.

An object of the present invention is to provide a valve in or for a hydraulic control system which obviates or mitigates the above disadvantage.

According to the present invention there is provided a hydraulic control system for a motor vehicle having a plurality of hydraulically operated attachments, including valve means for controlling hydraulic pressure so that a constant hydraulic pressure may be supplied to one of the said attachments while an intermittent hydraulic pressure is supplied, simultaneously, to another attachment.

Further, according to the present invention, there is provided a valve comprising a valve body; a valve member selectively movable in said body between first, second and third positions; first, second, third and fourth ports in said body; passages in said valve member and adapted to connect said ports; and a one way check valve in one of said passages; in which, with the valve member in said first position, said passages connect said first port to said second port and said third and fourth ports are isolated; with the valve member in said second position, said passages connect said first port to said fourth port and to said second port through said one-way check valve and said third port is isolated; and with the valve member in said third position, said passages connect said first port to said fourth port and said second and fourth ports are isolated.

Further, according to the present invention there is provided a hydraulic control system for a motor vehicle, especially but not exclusively a tractor, including a valve as aforesaid.

Still further, according to the present invention there is provided a tractor including a hydraulic control system as aforesaid.

Said first port may then be selectively connected through a control valve to a source of hydraulic fluid under pressure, and said second, third and fourth ports may be connected to hydraulically operated tractor attachments.

Preferably, said second port is connected to a hydraulic ram for raising and lowering the draft links of the tractor.

Embodiments of the invention will now be described, by way of example, with reference to the accompanying drawings in which.

Figure 1:
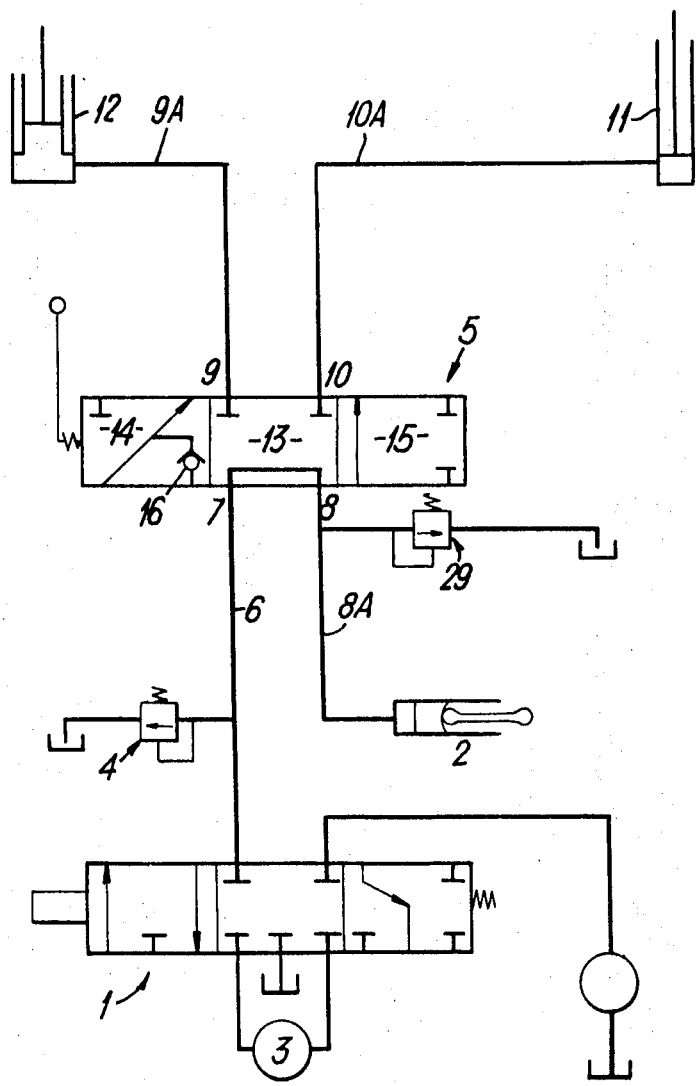
FIG. 1 is a hydraulic circuit diagram of a tractor hydraulic control system including a valve according to the present invention.

Referring to FIG. 1, a hydraulic control system for an agricultural tractor includes a three-position, five-port, control valve 1, of which the primary function is to control hydraulic fluid supply to a hydraulic ram 2 for raising and lowering the draft links of the tractor. Hydraulic fluid under pressure is supplied to the system by a pump 3, and a relief valve 4 is provided in the supply line to the ram 2 for maintaining the hydraulic pressure within desired limits. The control valve 1 may be operated manually or automatically and is connected to a selector valve 5 through a hydraulic line 6.

The selector valve 5 has first, second, third and fourth ports 7, 8, 9 and 10, respectively. The port 7 is connected through the line 6 to the control valve 1; the port 8 is connected through a hydraulic line 8A to the ram 2; the port 9 is connected through a hydraulic line 9A to an attachment in the form of a tipping trailer jack 12; and the port 10 is connected through a hydraulic line 10A to an attachment in the form of a loader jack 11.

In operation of the three attachments, that is, the ram 2, the trailer jack 12 and the loader jack 11, it is necessary that each may be operated independently of the others. It is also necessary that the ram 2 be operated constantly while one of the other attachments is operated intermittently. For example, it is often necessary to mount counterbalance weights on the draft links of the tractor when the loader jack 11 is being operated intermittently in order to prevent the tractor toppling. Thus, a constant pressure must be maintained in the ram 2 while pressure is being supplied intermittently to the jack 11.

The selector valve 5 has first, second and third operative positions designated in FIG. 1 by the panels 13, 14, and 15 respectively, adjacent the ports 7, 8, 9 and 10. In the first position, as shown in FIG. 1, with the panel 13 adjacent the ports 7, 8, 9 and 10, the ports 7 and 8 are hydraulically connected and the ports 9 and 10 are isolated. Thus, the ram 2 is directly controlled by the tractor control valve 1 and the jacks 11 and 12 are isolated.

In the second position of the selector valve 5, with the panel 14 adjacent the ports 7, 8, 9 and 10, the port 7 is hydraulically connected to the port 10 so that the loader jack 11 is directly controlled by the control valve 1 and the port 9 is isolated. The port 7 is also connected to the port 8 through a one-way check valve 16. Thus, operation of the valve 1 controls the jack 11 and supplies pressure to the ram 2 and this pressure will remain constant in the ram 2 due to the check valve 16. However, if the pressure in the ram 2 falls due to leakage, it will be "topped-up" each time the loader jack 11 is operated.

In the third position of the selector valve 5, with the panel 15 adjacent the ports 7, 8, 9 and 10, the port 7 is directly connected to the port 9 and the ports 8 and 10 are isolated. Thus the trailer jack 12 is directly controlled by the control valve 1.

Figure 2:
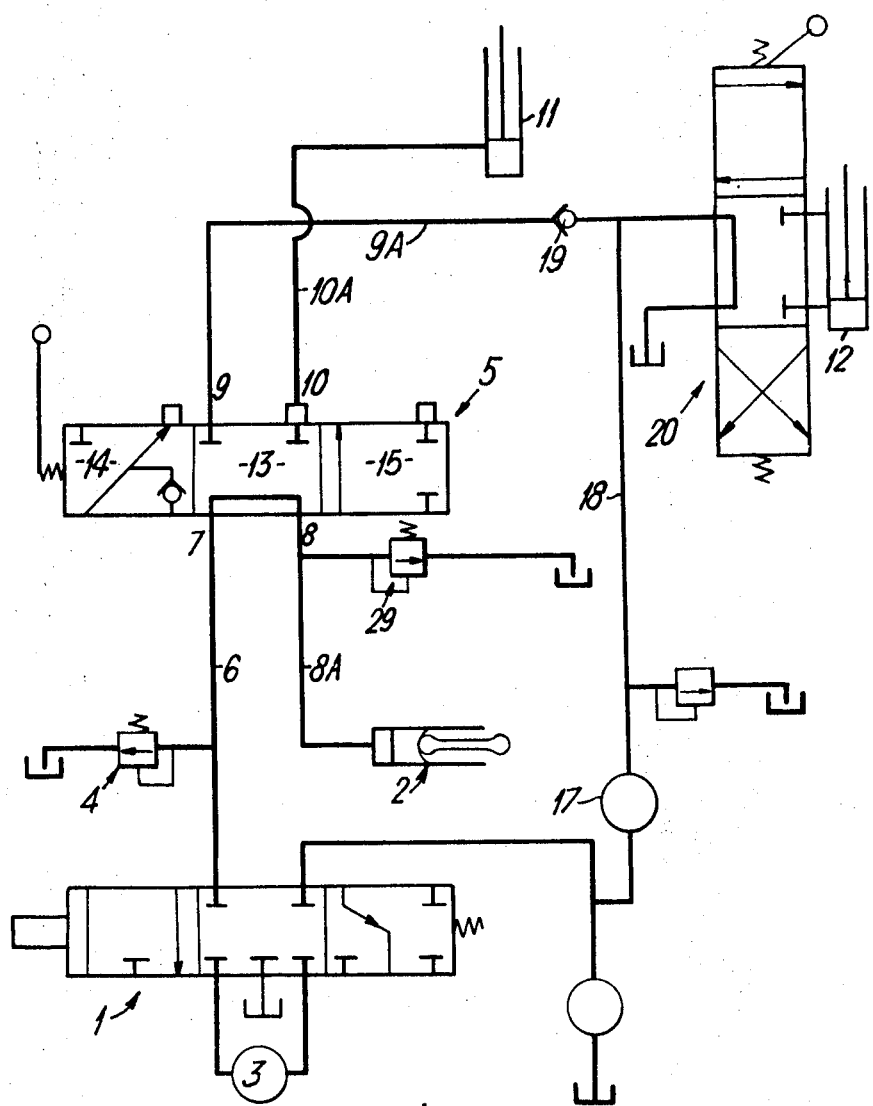
FIG. 2 is a hydraulic circuit diagram of a modified tractor hydraulic control system including a valve according to the present invention.

A modified embodiment of the invention is shown in FIG. 2, in which an auxiliary pump 17 is provided to supplement the flow of hydraulic fluid to a double-acting ram 12 of an attachment connected to the port 9. A line 18 connects the pump to the line 9A and the latter has a one-way check valve 19 inserted therein. In this case, the control valve 1 cannot be used to control the ram 12, due to the check valve 19. Thus a further control valve in the form of a three-position crossover valve 20 is provided in the system. All other ports of the system shown in FIG. 2 are similar to those already described with reference to FIG. 1 and are indicated by corresponding reference numerals.

Figure 3:
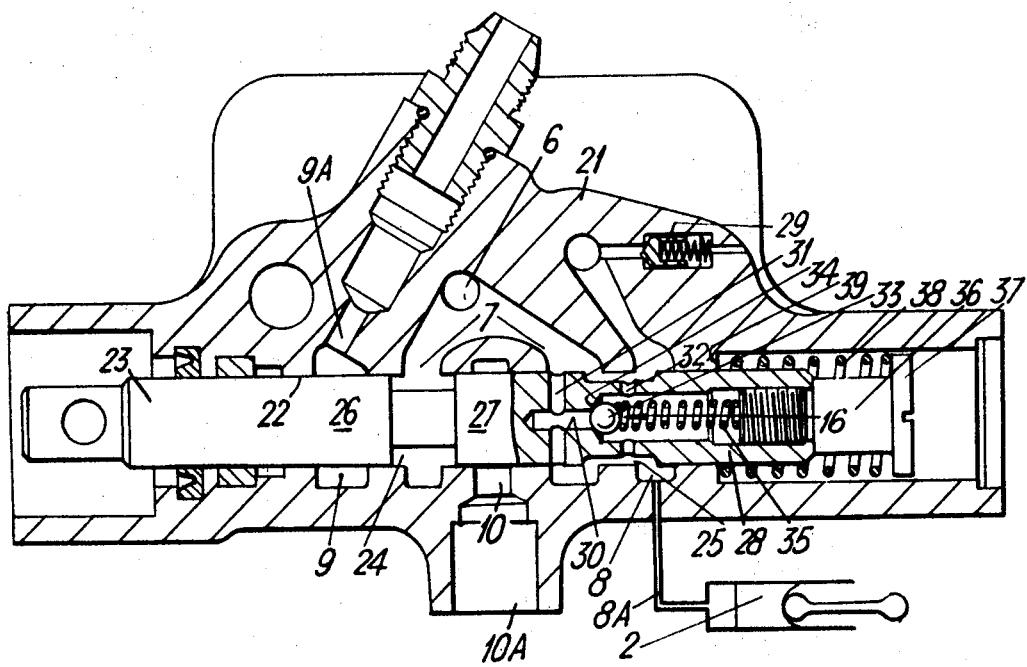
FIG. 3 is a sectional view of a valve according to the present invention.

FIG. 3 shows a practical form of the selector valve 5 which has a valve body 21 with a bore 22 therethrough, and ports 7, 8, 9 and 10. A valve member in the form of a spool 23 is slidably mounted in the bore 22 and includes passages which selectively connect the ports 7, 8, 9 and 10 in accordance with its position.

The ports 7, 8, 9 and 10 are in the form of annular recesses formed in the body 21 around the bore 22 and into which the corresponding hydraulic lines 6, 8A, 9A and 10 open, the port 7 is bifurcated as shown, and the port 8 is connected to a relief valve 29.

The passages in the spool 23 are formed by annular recesses 24 and 25 provided between lands 26, 27 and 28 on the spool 23, and an axial bore 30 drilled from one end of the spool 23 and intersecting spaced transverse bores 31 and 32. A ball 33 is provided in an enlarged portion of the bore 30 and cooperates with a valve seat 34 to form the check valve 16. A spring 35 maintains the ball 33 in contact with the seat 34 and abuts a closure member 36. The latter has an enlarged head 37, and a spring 38 extends between the head 37 and an abutment face 39 on the body 21.

The valve 5 is shown in its first position in FIG. 3, which is the position represented by the panel 13 in FIGS. 1 and 2. In this position, the ports 7 and 8 are connected through the recess 25 and the ports 9 and 10 are isolated by the lands 26 and 27, respectively.

The valve 5 is placed in its second position, which is the position represented by the panel 14 in FIGS. 1 and 2, by pushing the spool 23 to the right in FIG. 3 so that the ports 7 and 10 are connected by the recess 24, and the ports 7 and 8 are connected through the bore 31, the bore 30, the check valve 16 and the bore 32. The port 9 is isolated by the land 26. Thus, when the pressure on the port 7-side of the check valve is greater than that on the port 8-side, and the pressure is sufficient to overcome the force of the spring 35 the valve 16 opens and the pressure at the port 8 is "topped-up" by that existing at the port 7.

The third position of the valve 5 is achieved by pulling the spool 23 to the left in FIG. 3, so that the ports 7 and 9 are connected through the recess 24, and the ports 10 and 8 are isolated by the lands 27 and 28, respectively.

Although the invention has been described in relation to motor vehicles and especially tractors, the invention is applicable to other machinery which is hydraulically controlled.

I claim:

1. A hydraulic control system for a motor vehicle having a plurality of hydraulically operated attachments, including valve means for controlling hydraulic pressure so that a constant hydraulic pressure may be supplied to one of said attachments while an intermittent hydraulic pressure is supplied, simultaneously, to another attachment, the valve means include a valve body; a valve member selectively movable in said body between first, second and third positions; a first port in said body connected to a source of hydraulic pressure fluid, second, third and fourth ports in said body each connected to one of the hydraulically operated attachments; passages in said valve member and adapted to connect said ports; and a one-way check valve in one of said passages; in which with the valve member in said first position said passages connect said first port to said second port and said third and fourth ports are isolated, with the valve member in said second position said passages connect said first port to said fourth port and to said second port through said check valve and said third port is isolated, and with the valve member in said third position said passages connect said first port to said third port and said second and fourth ports are isolated.

2. A valve according to claim 1, in which said valve body has a bore therethrough and said valve member is in the form of a spool slidably mounted in the bore.

3. A valve according to claim 2, in which said ports are in the form of annular recesses formed in the valve body around said bore.

4. A valve according to claim 3, in which the first port is bifurcated.

5. A valve according to claim 4, in which said second port is connected to a relief valve.

6. A valve according to claim 2, in which said passages are formed by annular recesses provided between lands on the spool and by an axial bore intersecting spaced transverse bores, and in which a ball is provided in an enlarged portion of the axial bore and is spring biased towards a valve seat to form a one-way check valve.

References Cited

UNITED STATES PATENTS

| | | | |
|---|---|---|---|
| 2,343,689 | 3/1944 | Mercier | 91—413X |
| 2,737,196 | 3/1956 | Eames | 60—52H.G.(UX) |
| 3,307,275 | 3/1967 | Simi | 60—52H.G.(X) |

EDGAR W. GEOGHEGAN, Primary Examiner

U.S. Cl. X.R.

60—52H.G.; 91—444; 137—596.12